(12) United States Patent
Donnelly et al.

(10) Patent No.: US 7,470,346 B2
(45) Date of Patent: Dec. 30, 2008

(54) AQUEOUS COMPOSITIONS AND THEIR USE IN THE MANUFACTURE OF PAPER AND PAPERBOARD

(75) Inventors: Simon Donnelly, Michelbach le Haut (FR); Laurence Rys, Wilmslow (GB); Philip Ford, Suffolk, VA (US)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 10/548,357

(22) PCT Filed: Mar. 18, 2004

(86) PCT No.: PCT/EP2004/002807

§ 371 (c)(1),
(2), (4) Date: Sep. 7, 2005

(87) PCT Pub. No.: WO2004/088034

PCT Pub. Date: Oct. 14, 2004

(65) Prior Publication Data

US 2006/0096724 A1    May 11, 2006

Related U.S. Application Data

(60) Provisional application No. 60/459,835, filed on Apr. 2, 2003.

(30) Foreign Application Priority Data

Jan. 22, 2004    (GB) .................... 0401313.2

(51) Int. Cl.
*D21H 17/68* (2006.01)
*D21H 21/10* (2006.01)
*C01B 33/26* (2006.01)

(52) U.S. Cl. .................. 162/181.6; 162/158; 162/164.1; 162/181.8; 162/185; 106/287.34; 106/484; 423/330.1; 516/79; 516/110

(58) Field of Classification Search .......... 162/158, 162/164.1, 181.6, 181.8, 185; 106/287.34, 106/484; 516/70, 110; 423/330.1
See application file for complete search history.

(56) References Cited

U.S. PATENT DOCUMENTS

| | | | |
|---|---|---|---|
| 3,034,994 A | 5/1962 | Braithwaite et al. | 502/63 |
| 4,388,150 A * | 6/1983 | Sunden et al. | 162/175 |
| 4,431,749 A | 2/1984 | Hettinger et al. | 502/68 |
| 4,840,653 A | 6/1989 | Rabinovich | 65/395 |
| 4,935,228 A * | 6/1990 | Finkenaur et al. | 424/64 |
| 4,954,220 A * | 9/1990 | Rushmere | 162/168.3 |
| 5,470,435 A * | 11/1995 | Rushmere et al. | 162/181.6 |
| 5,543,014 A * | 8/1996 | Rushmere et al. | 162/181.6 |
| 5,624,651 A * | 4/1997 | Bass | 423/332 |
| 6,074,983 A | 6/2000 | Derolf et al. | 502/407 |
| 6,274,112 B1 * | 8/2001 | Moffett et al. | 423/338 |
| 6,406,594 B1 * | 6/2002 | Palmer et al. | 162/181.7 |
| 2002/0066540 A1 * | 6/2002 | Chen et al. | 162/17 |
| 2003/0139517 A1 * | 7/2003 | Nyander et al. | 524/492 |
| 2004/0238137 A1 * | 12/2004 | Donnelly et al. | 162/164.1 |

OTHER PUBLICATIONS

Smook, G.A., Handbook for Pulp & Paper Technologists, $2^{nd}$ Ed, Angus Wilde Publications, Vancouver, 1992, p. 225.*

"Helipath Stand", product information sheet [online], Brookfield, date unknown [retrieved on Oct. 26, 2007], Retrieved from the Internet: <URL: http://www.brookfieldengineering.com/~staging/products/accessories/helipath-stand.asp>.*

* cited by examiner

*Primary Examiner*—Steven P Griffin
*Assistant Examiner*—Dennis Cordray
(74) *Attorney, Agent, or Firm*—Shiela A. Loggins

(57) ABSTRACT

A process of preparing an aqueous composition comprising a polysilicate, wherein the composition is a substantially uniform liquid when measured at 25° C., comprising the steps of, i) providing an aqueous liquid having a source of silicate, ii) adjusting the pH of the liquid to between about 2 and about 10.5, thereby causing polymerisation of the silicate, iii) allowing sufficient time for the polymerisation to proceed to substantial completion and thereby forming a product comprising gelled material, iv) subjecting the gelled material to sufficient shear to form a substantially uniform liquid. The novel aqueous composition made by this process is useful in the manufacture of paper and paperboard either as a mineral filler or as a retention/drainage aid.

39 Claims, 2 Drawing Sheets

AQUEOUS COMPOSITIONS AND THEIR USE IN THE MANUFACTURE OF PAPER AND PAPERBOARD

Figure 1:
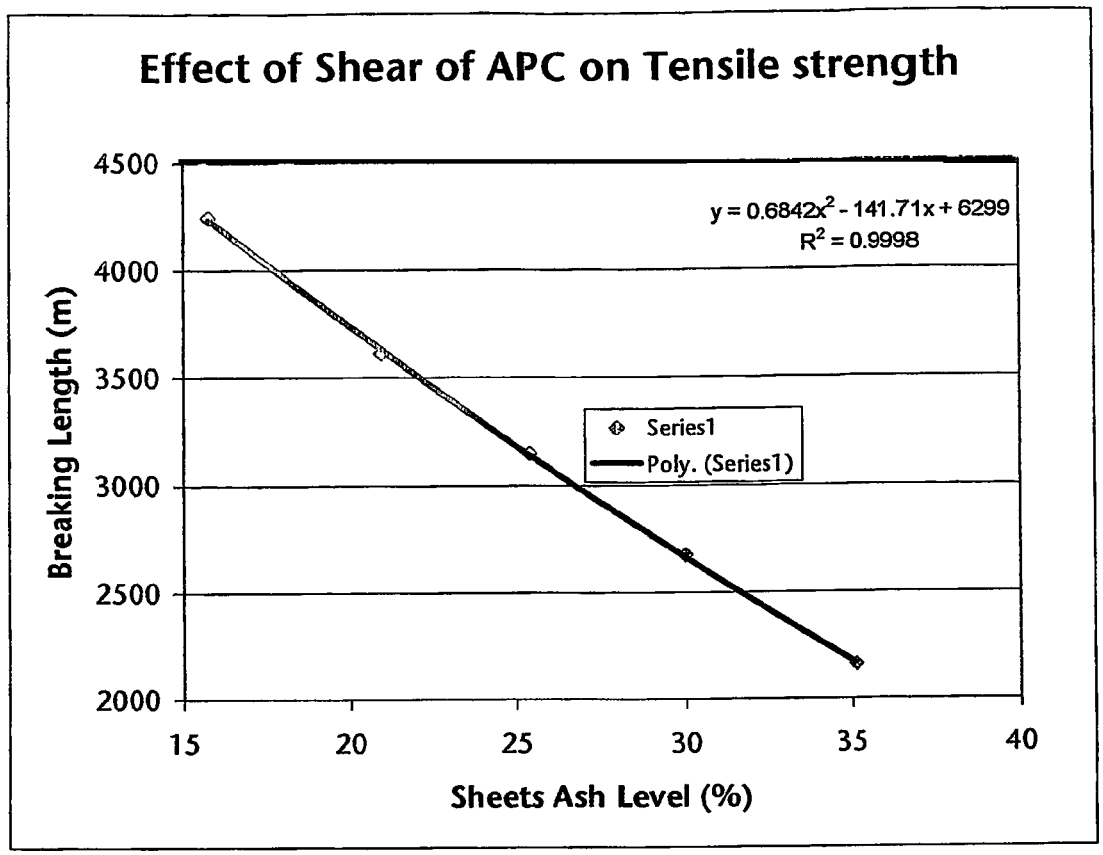

This application is a 371 of PCT/EP04/02807, filed on Mar. 18, 2004 which claims the benefit of Provisional Application No. 60/459,835, filed Apr. 2, 2003 herein incorporated by reference.

The present invention relates to aqueous polysilicate compositions and their preparation and use as either mineral fillers, strength aids or retention/drainage aids in the manufacture of paper and paperboard. Also included in the present invention of processes of making paper and paperboard in which the aqueous polysilicate compositions are included as mineral fillers and/or strength aids and/or retention/drainage aids.

It is common practice to include mineral filler in a papermaking process. For instance in EP-A-0880618 a processes of making filled paper is described in which cationised precipitated calcium carbonate (PCC) is included into a cellulosic suspension and forming a papermaking thin stock containing PCC. The process employs a polymeric retention aid having an intrinsic viscosity of at least 4 dl/g and an anionic micro particulate material, such as micro particulate silica material and swellable clay. Filler retention is improved and the process allows the production of highly filled paper.

WO-A-99/04092 is concerned with the problems of reduced strength that can occur with high filled paper. A process is proposed in which a silicate composition is introduced into a cellulosic suspension and in which the silicate forms a three-dimensional network around the cellulosic fibres. In one system (Ca—Flocc) a silicate such as sodium silicate is mixed with a calcium compound, such as calcium oxide, the mixture is mixed with cellulosic fibre which is then acidified to a pH of between 7 and 9 and polymerisation of the silicate occurs. Another system proposed (Mg—Flocc) uses for instance sodium silicate and a magnesium compound in place of the calcium compound. In this case polymerisation or gelling of the reaction mixture can be done partly outside the presence in the fibre, although the mixture will continue to polymerise in the presence in the fibre. A further system proposed (Si—Flocc) employs silicate which is then acidified to a pH of from about 7 to 9. Aluminium compounds may be added to any of the three systems.

The Mg—Flocc and Si—Flocc systems can be practised by forming the compositions started outside the presence of fibre. The polysilicate systems are allowed to cure by allowing sufficient time to form sufficient cross links, but the system is preferably agitated so that it will not over solidly. The process provides significant strength improvements. However, in some cases there can be problems in achieving consistent formation and this can lead to sporadic loss of strength. In such cases the paper may contain significantly more light spots and holes.

Therefore, there is a need to provide an improved process for preparing highly filled paper which exhibits improved formation and more consistently high strength. There is also a need for a process which provides paper having further improvements in strength, particularly wet strength.

It is common practice to use retention and drainage aids in the manufacture of paper and paperboard. For instance cationic polyacrylamides and cationic starch are very effective retention/drainage aids used in papermaking. U.S. Pat. No. 4,388,150 describes a binder composition comprising colloidal silica and cationic starch for addition to the papermaking stock to improve retention of the stock components or for addition to the white water to reduce pollution problems and to recover stock components values. The colloidal silica may take various forms, including that of polysilicic acid, as that the best results are obtained through the use of silica in colloidal form. Polysilicic acid itself is said to be undesirable and without stabilisation deteriorates on storage.

U.S. Pat. No. 4,954,220 discloses work which reveals that some storage or ageing of polysilicic acid is desirable. However, the patent states that complete gelation of aqueous solutions of polysilicic acid is to be avoided since once gelled the solutions have little benefits for use as a retention and drainage aid. U.S. Pat. No. 4,954,220 reveals that the storage or ageing of polysilicic acid that leads to the formation of silica micro gels is beneficial and the use of the silica micro gels with various cationic polymers is said to provide retention and drainage aid systems which are at least the equivalent and in many cases superior of those provided by colloidal silica/cationic starch combinations. The silica micro gels can be formed by acidification of silicate to a pH of about 2 to 10.5, some storage or ageing of the solution is usually required to permit the formation of polysilicic acid micro gels and after the ageing period, which may be very brief (a few minutes or so) the solution is diluted to about 1 weight % or less in order to stabilise it and retard further growth of the micro gels.

EP-A-0235893 describes a process for making paper and paperboard by adding a cationic polymer of molecular weight of at least 500,000 before a shear stage and an inorganic material comprising bentonite after that shear stage. The process has brought about significant benefits in terms of improved drainage time and increased fibre and filler retention.

However, despite these improvements there is still a need for an alternative retention/drainage system that provides an equivalent or improved combination of retention and drainage. In addition it would be desirable to provide a method of making paper and exhibiting improved visual properties and/or strength characteristics, especially in making filled paper and in particular where the filler is a synthetic filler.

According to the present invention we provide an aqueous composition comprising polysilicate which is particularly useful either as being mineral filler or as a retention/drainage aid. The aqueous composition when used as a mineral filler allows for formation of highly filled paper exhibiting high strength and formation. In addition, we have found that when the aqueous composition is used at least as part of the retention/drainage system retention and drainage are at least as effective as known systems using inorganic retention/drainage aids, for instance micro particulate silica based systems or systems employing swellable clay.

In one aspect of the present invention we provide a process of preparing an aqueous composition comprising a polysilicate, wherein the composition is a substantially uniform liquid when measured at 25° C., comprising the steps of, i) providing an aqueous liquid having a source of silicate,
ii) adjusting the pH of the liquid to between about 2 and about 10.5, thereby causing polymerisation of the silicate,
iii) allowing sufficient time for the polymerisation to proceed to substantial completion and thereby forming a product comprising gelled material,
iv) subjecting the gelled material to sufficient shear to form a substantially uniform liquid.

The source of silicate may be a suitable silicate compound that will undergo gelation to form a polysilicate. Suitably such silicate compounds are water-soluble monomeric silicates of monovalent cations. Preferably the source of silicate is selected from the group consisting of sodium silicate, potassium silicate and lithium silicate.

The concentration of silicate is desirably sufficient to provide optimum polymerisation. If the concentration is too low then polymerisation will not occur or will proceed at a rate which is unacceptably slow. If the concentration is too high then the rate of polymerisation is likely to be uncontrollable. Suitably the concentration of sodium silicate should be in the range that the 1% to about 7%, preferably from about 2% to about 3%.

It may be desirable to include aluminium compounds in the aqueous liquid of step (i). The presence of aluminium ions will tend to increase the rate of gelation and induce the formation of cross links. This may be beneficial for reducing the reaction time. Typically the aluminium compound will be any suitable water-soluble aluminium compound, for instance aluminium sulphate or alum. Typically an aluminium compound, such as alum, may be added in an amount up to about 0.4 g/g of silicate. Thus in a preferred form a polysilicate is a poly alumino silicate.

The acidification may be achieved by introducing acidic compounds, such as mineral acids or by introducing substances which dissolve in the aqueous liquid to form acid, such as carbon dioxide. Alternatively acidification may be achieved using ion exchange resins. Preferably acidification is achieved by the addition of gaseous carbon dioxide. The acidification should be to a pH that provides optimum polymerisation or gelation. Desirably in step (ii) the pH is adjusted to between 4 and 9, preferably to between 6 and 8.

The polymerisation of silicate should proceed substantially to completion. In this context substantially to completion means that there is no evident further gelation occurring, although it is possible that there is some degree of reaction still occurring to a lesser extent. In one form polymerisation of an aqueous solution of silicate can be conducted in a vessel to produce a product that is a uniform gelled solid. However, in this form it may be less convenient to carry out the shearing in the final stage of the process. Therefore, it is usually preferred to agitate the liquid during the polymerisation step. Thus in a preferred form the product formed in step (iii) comprises amorphous gelled solids dispersed in the liquid.

The first three steps of this process may be carried out in a similar manner to that described in WO-A-99/04092, especially in regard to the preparation of Si—Flocc in absence of cellulosic fibre, given on pages 19, 30 and 31. The product formed will contain gelled polysilicate, typically in the form of amorphous solids dispersed in a relatively low viscosity liquid.

The final step of process may be achieved by using any conventional high shear equipment. Desirably the shearing equipment can be either a Silverson or an Ultra Thurrax Homogeniser. In one preferred form the product containing the gelled silicate is subjected to shearing using either piece of equipment for one minute at 8000 rpm. The shearing must be sufficient to ensure that a substantially uniform liquid is formed. By substantially uniform liquid we mean that the liquid contains essentially no large sized polysilicate solids which are clearly visible. By this we mean that there are substantially no particles of several millimetres or more. However, it is possible that the composition comprises very small polysilicate particles. Such very small polysilicate particles would normally be less than 1 mm in diameter, for instance and at least 90% by weight below 1 mm diameter. Preferably such very small polysilicate particles will be below 750 microns, preferably below 500 microns. Generally, any polysilicate particles of particle diameter greater than 150 microns should form less than one-third of the aqueous composition. Preferably the composition will comprise less than 20% by weight polysilicate particles of diameter greater than 150 microns, more preferably less than 10%. It is especially preferred the proportion of such polysilicate particles will be less than 1% and in particular less than 0.1%. Furthermore, it is preferred that the aqueous composition does not contain any other solids, for instance cellulosic fibres.

The aqueous composition formed by this process is novel. The composition must be in form of a uniform liquid. It may for instance be in the form of a uniform gelatinous paste. Typically the composition will be significantly more viscous than the dispersion of amorphous polysilicate solids. Preferably an aqueous composition of the invention will exhibit a viscosity of at least 200 mPas (when measured at 2% by weight concentration at 25° C. using a Brookfield viscometer, at 20 rpm, spindle No 2) and preferably at least 300 or 400 mPas and more preferably at least 600 mPas. It is particularly preferred that the viscosity is at least 1500 mPas (when measured at 2% by weight concentration at 25° C. using a Brookfield viscometer, at 20 rpm, spindle No 3). The viscosity may be as high as 5000 mPas or higher. Usually though the viscosity will be in the range of between 1700 and 3000 mPas, preferably around 2000 mPas.

The polysilicate comprised in the aqueous composition will normally have a relatively high surface area in comparison to many conventional mineral fillers, such as ground calcium carbonate. However, by comparison to many micro particulate polysilicate products such as polysilicate micro gels, the polysilicate will tend to have a relatively low surface area. Generally the polysilicate has a surface area of below 2000 $m^2/g$, preferably in the range of from 750 to 1250 $m^2/g$, more preferably around 1000 $m^2/g$.

The S-value indicates the degree of aggregation or microgel formation and a lower S-value is indicative of a higher degree of aggregation. The S-value can be measured and calculated as described by Iler & Dalton in J. Phys. Chem. 60 (1956), 955-957. Typically a polysilicate micro gel will exhibit and S-value of around 12% or higher. The polysilicate comprised in the aqueous composition of the present invention will typically have an S-value of below 5%. Preferably the polysilicate will have an S-value in the range of 1 to 4%, preferably around 2.5 to 3.5%.

The aqueous composition according to the present invention is a novel entity and can be defined by the unique combination of parameters. Thus we provide an aqueous composition comprising a polysilicate, wherein the composition is a substantially uniform liquid when measured in at 25° C. and the composition exhibits a viscosity of at least 200 mPas (when measured at 2% by weight concentration at 25° C. using a Brookfield viscometer, at 20 rpm, spindle No 2) and preferably at least 300 or 400 mPas and more preferably at least 600 mPas, and wherein the polysilicate has a surface area of below 2000 $m^2/g$ and has an S-value of below 5%. It is particularly preferred that the viscosity is at least 1500 mPas (when measured at 2% by weight concentration at 25° C. using a Brookfield viscometer, at 20 rpm, spindle No 3). More preferred embodiments may be defined by the more specific viscosity, surface area and S-value parameters mentioned above.

The aqueous composition according to the present invention may be provided in any convenient form. Typically the aqueous composition will comprise a concentration of $SiO_2$ which is at least 0.01% by weight, preferably from about 1% to about 45%. More preferably the concentration will be between a about 1% and 7%, most preferably between 2% and 3%. A particular advantage of the aqueous composition is that it can be added into the cellulosic suspension without further modification.

The aqueous polysilicate composition of the invention is particularly suitable for use in the manufacture of paper or paperboard either as a mineral filler a strength aid or as a drainage/retention aid.

The present invention includes a process of making paper or paperboard comprising forming a cellulosic suspension, draining water from the suspension to form a wet sheet and then drying the sheet, characterised in that the aqueous polysilicate composition according to any of embodiments described herein is added to the cellulosic suspension.

Furthermore, the present invention also concerns a process of making paper or paperboard comprising forming a cellulosic suspension, draining water from the suspension to form a wet sheet and then drying the sheet, wherein an aqueous polysilicate is added to the cellulosic suspension, in which the aqueous polysilicate is formed by a method comprising the steps of,
  i) providing an aqueous liquid having a source of silicate,
  ii) adjusting the pH of the liquid to between about 2 and about 10.5, thereby causing polymerisation of the silicate,
  iii) allowing sufficient time for the polymerisation to proceed to substantial completion and thereby forming a product comprising gelled material, characterised in that the product of step (iii) is sheared before addition to the cellulosic suspension.

We have found that there are particular benefits in applying shear to the gelled polysilicate material prior to adding this to the cellulosic suspension. In particular we find that for equivalent filler contents improvements in strength can be achieved.

In a further form of the present invention we provide a process of making paper or paperboard comprising forming a cellulosic suspension, mixing a mineral filler into the suspension, draining water from the suspension to form a wet sheet and then drying the sheet, characterised in that the mineral filler comprises the aqueous polysilicate composition according to any of embodiments described herein.

The process enables highly filled paper to be prepared which exhibits high strength and improved formation. In particular the paper that is produced by this process is consistently of high-quality and exhibits no light spots or holes.

The aqueous polysilicate composition should be added to the cellulosic suspension in amounts consistent with those usually used for mineral fillers. Desirably the aqueous composition will be added in an amount of from 20 to 250 kg per tonne based on dry weight of cellulosic suspension. The polysilicate of the aqueous suspension may be the only filler used or alternatively further fillers may be used. In the case where other fillers are used in addition to the aqueous composition, these fillers may for instance be organic pigments, for the enhancement of paper opacity. Alternatively at least one further mineral filler can be used additional to the aqueous composition. The further mineral fillers may be any of the conventional fillers and these will include precipitated calcium carbonate (PCC), ground calcium carbonate, clay, calcined clay, talc, zeolites, silicas, titanium dioxide and structured pigments.

The aqueous polysilicate composition and further filler may be combined prior to addition to the cellulosic suspension. However, it is preferred that the aqueous composition and the further filler and are added separately. In some situations in may be beneficial to add the aqueous composition simultaneously with the further filler although usually it would be expected to add them sequentially. For some papermaking processes it may be desired for the aqueous composition and to be added to the cellulosic suspension prior to the further filler. Generally, it is preferred that the further filler is added first.

In the process of making paper in may also be desirable to include in the cellulosic suspension a retention and drainage system. This may for instance be any of the conventional retention and drainage aids that are commercially available. Preferably the retention and drainage system will include a polymeric retention/drainage aid and a micro particulate retention/drainage aid. The polymeric retention/drainage aid can be any of the group consisting of substantially water-soluble anionic, non-ionic, cationic and amphoteric polymers. The polymers may be natural polymers such as starch or guar gums, which can be modified or unmodified. Alternatively the polymers can be synthetic polymers, for instance polymers prepared by polymerising water-soluble ethylenically unsaturated monomers such as acrylamides, acrylic acid, alkali metal or ammonium acrylates or quaternised dialkyl amino alkyl-(meth) acrylates or -(meth) acrylamides. Usually the polymers will have a high molecular weight, for instance at least 500,000. Preferably the polymers will have molecular weights ranging from at least one million up to 20 or 30 million or higher. Typically the polymers will have molecular weights between 5 and 15 million.

The micro particulate retention/drainage aid can be based on cross-linked organic polymers. Typically such polymers may be in the form of micro emulsions, for instance as described in EP484,617 and commercialised by Ciba Specialty Chemicals under the trade name Polyflex. Alternatively the micro particulate retention/drainage aid may be inorganic, such as silica microgels, colloidal silica, silica sols, silica gels, polysilicates, aluminosilicates, polyaluminosilicates, borosilicates, polyborosilicates, zeolites or swellable clay.

The swellable clays may for instance be typically a bentonite type clay. The preferred clays are swellable in water and include clays which are naturally water swellable or clays which can be modified, for instance by ion exchange to render them water swellable. Suitable water swellable clays include but are not limited to clays often referred to as hectorite, smectites, montmorillonites, nontronites, saponite, sauconite, hormites, attapulgites and sepiolites. Typical anionic swelling clays are described in EP-A-235893 and EP-A-335575.

The aqueous composition may be added as a filler to the cellulosic suspension as a thin stock, that is after dilution. Alternatively in may be added further back in the system, for instance in the thick stock, the blend chest or the mixing chest. The point of addition may vary according to the particular layout of the paper making machine and the filler will be added at a point of addition that will give optimum incorporation into the cellulosic medium and optimum retention. Preferably the aqueous composition as a filler will be mixed into the cellulosic suspension before the retention and drainage system. Therefore preferably the retention and drainage system is applied to the cellulosic suspension subsequent to the addition of the mineral filler.

According to a further form of invention, the aqueous composition comprising polysilicate forms part or all of the retention and drainage system. Thus we have found that the aqueous composition can perform in a similar manner to existing retention/drainage aids, in particular micro particulate products such as silica sols or swellable clays.

Therefore, according to this aspect of the invention we provide a process of making paper or paperboard comprising forming a cellulosic suspension, applying a retention and drainage system to the suspension, draining water from the suspension form a sheet and then drying the sheet, characterised in that the retention and drainage system comprises mixing into the cellulosic suspension the aqueous polysilicate composition according to any of the embodiments described herein.

When used as a retention/drainage aid the aqueous polysilicate composition is desirably mixed into the cellulosic suspension in an amount of at least 100 g per tonne, based on weight of silica on dry weight of suspension. Preferably the amount will be at least 500 grams per tonne and usually significantly higher, especially when used substantially in the absence of micro particulate retention/drainage aids. We have found that for some systems optimum retention and drainage is achieved using doses as high as 250 kg per tonne. In one preferred form the dose is in the range of 20 to 250 kg per tonne.

The aqueous polysilicate composition will normally form part of the retention and drainage system. Thus in addition to the aqueous composition the retention and drainage system preferably further comprises mixing into the cellulosic suspension a polymeric retention/drainage aid and/or a micro particulate retention/drainage aid. Usually though, the aqueous polysilicate composition is used as a partial or complete replacement of the micro particulate retention/drainage aid and thus will normally be used in a system that includes the use of a polymeric retention/drainage aid.

The polymeric retention/drainage aid can be selected from the group consisting of substantially water-soluble anionic, non-ionic, cationic and amphoteric polymers. The polymers may be any of the aforementioned polymeric retention/drainage aids.

The micro particulate retention/drainage aid can be based on cross-linked organic polymers, for instance as described in EP-A484617. Alternatively the micro particulate retention/drainage aid may be inorganic, such as silica microgels, colloidal silica, silica sols, silica gels, polysilicates, aluminosilicates, polyaluminosilicates, borosilicates, polyborosilicates, zeolites or swellable clay. The micro particulate retention/drainage aid may be for instance bentonite type clays as given in EP-A-235,893, but desirably can be any of those micro particulate materials described above.

In one preferred embodiment of the invention a polymeric retention/drainage aid is mixed into the cellulosic suspension before at least one shear stage. The shear stage can be for instance mixing, cleaning or pumping stages, including for instance fan pumps and centri-screens etc. A retention/drainage aid comprising the aqueous polysilicate composition may then be added after that shear stage. Thus polymeric retention/drainage aid can be added to the cellulosic suspension followed by one or more shear stages and then the aqueous polysilicate composition can be added to the cellulosic suspension. In an alternative system a micro particulate retention/drainage aid is also added to the cellulosic suspension after that shear stage.

In a still further embodiment of the invention we provide a process of making paper or paperboard comprising forming a cellulosic suspension, mixing a mineral filler into the cellulosic suspension, applying a retention and drainage system that the suspension, draining water from the suspension to form a wet sheet and drying the sheet, characterised in that the mineral filler comprises the aqueous polysilicate composition of the invention, the suspension is passed through at least one shear stage before applying the retention and drainage system, and in which the retention and drainage system comprises introducing into the cellulosic suspension the aqueous polysilicate composition of the invention and in which the shear stage is selected from mixing, cleaning and pumping stages.

In one preferred form of this embodiment PCC mineral filler is added to the cellulosic suspension and the suspension is passed through at least one shear stage. The aqueous polysilicate composition of the invention is then mixed into the cellulosic suspension as part of the mineral filler. More preferably once the mineral filler, comprising the aqueous polysilicate composition, has been added the cellulosic suspension is passed through at least one shear stage followed by the addition of a polymeric retention/drainage aid. The cellulosic suspension is then passed through at least one further shear stage after which a retention/drainage aid comprising the aqueous polysilicate composition of invention is added to the cellulosic suspension. A micro particulate retention/drainage aid may also be added to the cellulosic suspension prior to, simultaneously with or after the addition of the retention/drainage aid comprising the aqueous polysilicate composition.

In one illustration of the invention an aqueous polysilicate composition is made first by preparation of a 2 weight % as $SiO_2$ amorphous silica gel created by the addition of carbon dioxide to a dilute solution of water glass (28.5% soluble silicate 9.2% sodium oxide). A significant quantity (up to possibly over 50%) of the silicate can be replaced with either sodium decaborate or sodium aluminate or other materials prior to carbonation. The solution is acidified to a pH of 6.9 to 7.1 and allowed the gel completely with limited stirring to produce a silica gel slurry comprising solid gel pieces and a less viscous solution. This gel slurry is sheared using a Silverson at 8000 rpm for one minute to produce a smooth viscous solution.

The smooth viscous polysilicate solution is then added to the paper making furnish prior to the retention and drainage aid in order to increase ash content of paper last retaining the paper strength.

EXAMPLES

Preparation of Aqueous Polysilicate Composition (APC) in all Examples

A steady stream of $CO_2$ was bubbled into a 2 wt % as $SiO_2$ sodium silicate solution (Na (3.27) 38/40 F from Akzo PQ Silica). pH was monitored with time using a calibrated pH electrode.

Preparation of Paper Sheets in all Cases

Five sheets for each variant listed below were prepared using the following order of addition.

Standard additions of 0.5 $kgt^{-1}$ cationic polyacrylamide (CPAM) and 2.0 $kg^{-1}$ and in bentonite slurry (BentS) were used for all handsheets without APC as a retention and drainage aid. Where APC was used as a microparticle 0.5 $kgt^{-1}$ cationic polyacrylamide was used as the cationic species. Dosages calculated on dry weight of cellulosic suspension (stock). The sequence of treatments is as follows:

| Stock | 5 s shear 1000 rpm | PCC | 5 s shear 1000 rpm | (APC) | 5 s shear 1000 rpm | CPAM | 50 s shear 1000 rpm | (BentS) or (APC) | 15 s shear 500 rpm |
|---|---|---|---|---|---|---|---|---|---|

Handsheets were prepared after the final mixing step and dried for 2 hours at 60° C. on the rotary drier.

Sheet Testing

Sheets were tested for tensile strength using an Instron 4400 at UMIST according to Tappi test method. T 494 OM-88.

The paper samples used for strength testing were then used to determine the total filler content of the handsheets by ashing at 500° C. for 2 hours.

Example 1

Preparation of Aqueous Polysilicate Composition (APC)

The preparation of APC was in accordance with the above description. The pH was monitored and recorded in Table 1.

TABLE 1

| Time (mins) | pH | |
|---|---|---|
| 0 | 11.05 | Weight Sodium Silicate (water glass) = 69.97 g |
| 1 | 10.13 | Weight Sodium Silicate + $H_2O$ = 1007.3 g |
| 2 | — | |
| 3 | 8.99 | |
| 4 | 8.14 | |
| 5 | 7.10 | |
| 6 | 7.02 | |
| 7 | 7.02 | Gelled at 7 minutes |
| 8 | 7.02 | |
| 9 | 7.05 | |
| 10 | 7.06 | |
| 15 | 7.06 | |

Example 2

Effect of Shear on APC Performance 100 mls APC was sheared for the relative time at 20,000 rpm using an Ultra Thurrax homogeniser. The results are shown in Table 2.

TABLE 2

| No | Variant | APC addition Point | Ash Content (%) | Breaking Length (m) |
|---|---|---|---|---|
| 1 | 5.0% APC (no shear) | 5 secs pre polymer | 41.0 | 1548.9 |
| 2 | 5.0% APC (30 s shear) | 5 secs pre polymer | 39.2 | 2163.2 |
| 3 | 5.0% APC (60 s shear) | 5 secs pre polymer | 38.1 | 2202.7 |
| 4 | 5.0% APC (15 s shear) | 5 secs pre polymer | 38.7 | 2076.7 |

All sheets contained 35% PCC to target a sheet ash content of 40%.

In the results clearly show that shearing the aqueous polysilicate composition improves the paper strength.

Example 3

Effect of Addition Point on APC Performance

Sheared APC was used throughout (1 min at 20000 rpm using an Ultra Thurrax homogeniser). The results are shown in Table 3.

TABLE 3

| No | Variant | APC addition Point | Ash Content (%) | Breaking Length (m) |
|---|---|---|---|---|
| 19 | 5.0% APC (sheared) | 10 mins pre polymer | 37.7 | 2241.0 |
| 20 | 5.0% APC (sheared) | 5 mins pre polymer | 37.9 | 2258.8 |
| 21 | 5.0% APC (sheared) | 1 min pre polymer | 38.3 | 2077.1 |
| 22 | 5.0% APC (sheared) | 5 secs pre polymer | 38.2 | 2140.5 |
| 23 | 5.0% APC (sheared) | Pre BentS | 41.3 | 1624.9 |
| 24 | 5.0% APC (sheared) | Post BentS | 40.6 | 1592.2 |
| 25 | 5.0% APC (sheared) | Replace BentS | 39.7 | 2093. |

All sheets contained 35% PCC to target a sheet ash content of 40%.

The results show improvements in strength using the sheared aqueous polysilicate composition, especially when it is added before the polymer.

Example 4

Preparation of Aluminated APC Samples

Sample Preparation

TABLE 4

| 100% Aluminated APC | | |
|---|---|---|
| Time (mins) | pH | Weight Sodium Aluminate = 5.53 g<br>Weight Sodium Silicate = 0.00 g |
| 0 | — | Weight solids and water = 200.1 g |
| 0 (post Al) | 12.4 | |
| 1 | 11.03 | After 20 s of $CO_2$ addition a white turbid precipitate was formed |
| 2 | 10.46 | |
| 3 | 9.38 | |
| 4 | 7.5 | |
| 5 | 7.3 | |
| 7 | 7.15 | |
| 9 | 7.12 | |
| 11 | 7.11 | |
| 13 | 7.11 | |
| 15 | 7.11 | |

TABLE 5

| 50% Aluminated APC | | |
|---|---|---|
| Time (mins) | pH | Weight Sodium Aluminate = 2.77 g<br>Weight Sodium Silicate = 7.05 g |
| 0 | 11.10 | Weight solids and water = 201.3 g |
| 0 (post Al) | 12.3 | |
| 1 | 10.38 | The solution gelled Solid after 1 minute of $CO_2$ addition |
| 2 | 9.81 | |
| 3 | 9.47 | |
| 4 | 9.07 | |
| 5 | 8 | |
| 7 | 7.4 | |
| 9 | 6.96 | |
| 11 | 9.92 | |
| 13 | 6.89 | |
| 15 | 6.89 | Sampled |

TABLE 6

10% Aluminated APC

Weight Sodium Aluminate = 0.553 g
Weight Sodium Silicate = 12.21 g
Weight solids and water = 200.4 g

| Time (mins) | pH | |
|---|---|---|
| 0 | 11.07 | |
| 0 (post Al) | 11.41 | |
| 1 | 9.12 | No gelling of the carbonated mixture was observed |
| 2 | 6.98 | during carbonation. After 1 hour standing the sample |
| 3 | 6.83 | had gelled |
| 4 | 6.83 | |
| 5 | 6.82 | |
| 7 | 6.82 | |
| 9 | 6.82 | |
| 11 | 6.82 | |
| 13 | 6.82 | |
| 15 | 8.62 | Sampled |

TABLE 7

5% Aluminated APC

Weight Sodium Aluminate = 0.277 g
Weight Sodium Silicate = 13.26 g
Weight solids and water = 200.9 g

| Time (mins) | pH | |
|---|---|---|
| 0 | 11.00 | |
| 0 (post Al) | 11.34 | |
| 1 | 9.32 | No gelling of the carbonated mixture was observed |
| 2 | 8.23 | during carbonation. After 1 hour standing the sample |
| 3 | 6.87 | had gelled as usual |
| 4 | 6.84 | |
| 5 | 6.83 | |
| 7 | 6.83 | |
| 9 | 6.83 | |
| 11 | 6.83 | |
| 13 | 6.83 | |
| 15 | 6.83 | |

TABLE 8

Standard APC

Weight Sodium Aluminate = 0.0 g
Weight Sodium Silicate = 14.00 g
Weight solids and water = 199.6 g

| Time (mins) | pH | |
|---|---|---|
| 0 | 10.98 | |
| 1 | 9.82 | |
| 2 | 8.38 | Sample gelled at 7 mins |
| 3 | 6.95 | |
| 4 | 6.92 | |
| 5 | 6.93 | |
| 7 | 6.92 | |
| 9 | 6.92 | |
| 11 | 6.92 | |
| 13 | 6.92 | |
| 15 | 6.92 | Sampled |

TABLE 9

| Variant | APC Addition Point | Average Breaking Length (m) | Average Ash Content (%) |
|---|---|---|---|
| 30% PCC | N/A | 3122.1 | 30.6 |
| 50 kgt$^{-1}$ standard APC | Before R & D system | 4412.5 | 19.0 |
| 50 kgt$^{-1}$ 50% Al APC | Replacing BentS | 4149.5 | 23.9 |
| 50 kgt$^{-1}$ standard APC | Replacing BentS | 3886.8 | 25.2 |
| 25% PCC | N/A | 3868.9 | 24.4 |
| 50 kgt$^{-1}$ 10% Al APC | Replacing BentS | 3903.1 | 26.0 |
| 50 kgt$^{-1}$ 5% Al APC | Before R & D system | 4178.4 | 21.8 |
| 50 kgt$^{-1}$ standard APC | Replacing BentS | 3964.7 | 24.2 |
| 50 kgt$^{-1}$ 10% Al APC | Before R & D system | 4165.9 | 21.4 |
| 50 kgt$^{-1}$ 50% Al APC | Before R & D system | 4392.4 | 19.9 |
| 20% PCC | N/A | 4115.6 | 20.6 |
| 50 kgt$^{-1}$ 5% Al APC | Replacing BentS | 3861.4 | 25.3 |
| 50 kgt$^{-1}$ 100% Al APC | Replacing BentS | 3436.2 | 24.2 |
| 15% PCC | N/A | 4839.2 | 16.0 |

All APC containing variants contained 20% PCC to target an ash content of 25% in the finished sheet.

Example 5

Effect of Polyaluminosilicate Microgel (MG) at APC Addition Levels

TABLE 10

| Variant | APC Addition Point | Average Breaking Length (m) | Average Ash Content (%) |
|---|---|---|---|
| 5% standard APC | Before R & D system | 3671.8 | 23.4 |
| 5% MG | Before R & D system | 5714.7 | 6.9 |
| 30% PCC | N/A | 2016.8 | 33.1 |
| 25% PCC | N/A | 2814.1 | 24.7 |
| 20% PCC | N/A | 3104.7 | 19.6 |
| 15% PCC | N/A | 3794.0 | 15.2 |
| 0% PCC | N/A | 6412.9 | .4 |

All APC containing variants contained 20% PCC to target an ash content of 25% in the finished sheet.

Example 6

A number of handsheets were prepared with samples of APC sheared to various levels using a number of homogenisers and shearing for different lengths of time.

The sheared samples of APC were assessed for viscosity and lump weight The prepared sheets were tested for tensile strength, ash content, and for appearance.

APC Sample Preparation

A 2.0 wt % sample of APC was prepared according to the method outlined in the first paragraph under examples.

200 mls of the APC sample was sheared for various intervals using either a Silverson at 2,000 rpm or an Ultra Thurrax homogeniser at 13,500 rpm.

TABLE 11

Shear used for APC samples

| Sample | Mixer | Time (s) |
|---|---|---|
| Shear 1 | No Shear | 0 |
| Shear 2 | Ultra Thurrax 13,500 rpm | 120 |
| Shear 3 | Ultra Thurrax 13,500 rpm | 15 |
| Shear 4 | Silverson 2000 rpm | 60 |
| Shear 5 | Silverson 2000 rpm | 30 |
| Shear 6 | Silverson 2000 rpm | 15 |

A 1 wt % sample of cationic polyacrylamide (CPAM) and a 5 wt % sample of bentonites slurry (BentS) were prepared.

A 50:50 blend of hard and softwoods, beaten to 50° SR was prepared and diluted to a consistency of 0.5% solids.

A 10% slurry of Calopaque F (PCC) was prepared.

The cationic polyacrylamide and the bentonite slurry were diluted to 0.1% prior to stock addition.

Handsheet Preparation 5 sets of sheets for each variant listed below were prepared using the following order of addition.

Standard additions of 0.5 kgt$^{-1}$ cationic polyacrylamide and 2.0 kgt$^{-1}$ bentonite slurry were used for all handsheets.

The following sequence was employed.

| Stock 5 s Shear 1000 rpm | PCC 5 s Shear 1000 rpm | APC 5 s Shear 1000 rpm | CPAM 50 s Shear 1000 rpm | BentS 15 s Shear 500 rpm |
|---|---|---|---|---|

Handsheets were prepared after the final mixing step, and dried on the rotary drier for 2 hours at 65° C.

TABLE 13

| No | Variant |
|---|---|
| 13 | 20% PCC and 5% APC (Shear 2) |
| 15 | 20% PCC and 5% APC (Shear 1) |
| 16 | 20% PCC and 5% APC (Shear 3) |
| 17 | 20% PCC and 5% APC (Shear 4) |
| 18 | 20% PCC and 5% APC (Shear 5) |
| 19 | 20% PCC and 5% APC (Shear 6) |
| 26 | 15% PCC |
| 27 | 20% PCC |
| 28 | 25% PCC |
| 29 | 30% PCC |
| 30 | 35% PCC |

APC Evaluation

The samples of sheared (and unsheared APC) were evaluated using a Brookfield viscometer at 20 rpm for low shear viscosity and for lump weight. Lump weight was determined by taking 100 mls of the APC sample, diluting to 500 mls with tap water and filtering through a pre weighed 150μ sieve. The APC was then washed with a further 100 mls of tap water before all excess water was removed from the sieve using a piece of blue roll. The sieve was then weighed again and the weight of APC lumps calculated.

Handsheet Testing

The dried sheets were then assessed for appearance using a transparency scanner to give a greyscale impression of the sheet with the gel spots appearing as light spots in the image.

The handsheets were conditioned at 23° C. and at 50% humidity prior to testing for tensile strength at UMIST.

The ash content of the handsheets was determined was carried out at 500° C. for 2 hours.

Results

Sample Preparation

TABLE 14

| | Standard APC | |
|---|---|---|
| Time (mins) | pH | Weight Sodium Silicate = 70.05 g |
| 0 | 10.98 | Weight solids and water = 999.6 g |
| 1 | 9.82 | |
| 2 | 8.38 | |
| 3 | 6.95 | |
| 4 | 6.92 | |
| 5 | 6.93 | |
| 7 | 6.92 | Sample gelled at 7 mins |
| 9 | 6.92 | |
| 11 | 6.92 | |
| 13 | 6.92 | |
| 15 | 6.92 | |

APC Evaluation

TABLE 15

APC low shear Viscosity and Lump Counts

| | Sample | | | | | |
|---|---|---|---|---|---|---|
| | 1 | 2 | 3 | 4 | 5 | 6 |
| Shear (speed) | No Shear | UT (13500) | UT (13500) | Silv. (2000) | Silv. (2000) | Silv. (2000) |
| Shear Time (s) | | 120 | 15 | 60 | 30 | 15 |
| Viscosity Spindle No. | 1 | 2 | 2 | 2 | 2 | 2 |
| Reading | 27.5 | 32.7 | 34.5 | 20.0 | 24.8 | 19.5 |
| | 29.5 | 32.6 | 30.5 | 19.0 | 22.6 | 17.5 |
| | 31.5 | 31.0 | 32.5 | 20.5 | 23.0 | 18.4 |
| | 31.5 | 31.9 | 32.3 | 20.1 | 24.0 | 16.9 |
| | 27.5 | 31.5 | | 19.2 | | |
| Viscosity (mPas) | 147.5 | 638.8 | 649.25 | 395.2 | 472.0 | 364.0 |
| Lump & Sieve Wt. (g) | 141.74 | 96.548 | 101.76 | 113.25 | 117.67 | 129.09 |
| Sieve Wt. (g) | 96.418 | 96.515 | 96.730 | 96.676 | 96.289 | 96.298 |
| Lump Wt. (g) | 45.322 | 0.033 | 5.030 | 16.574 | 21.381 | 32.792 |

Handsheet Testing

TABLE 16

Strength and Ash Results

| No | Variants | Breaking Length (m) | Ash Content (%) |
|---|---|---|---|
| 13 | 20% PCC and 5% APC (Shear 2) | 4062.6 | 19.4 |
| 15 | 20% PCC and 5% APC (Shear 1) | 2539.9 | 31.0 |
| 16 | 20% PCC and 5% APC (Shear 3) | 3054.9 | 27.5 |
| 17 | 20% PCC and 5% APC (Shear 4) | 3220.6 | 27.3 |
| 18 | 20% PCC and 5% APC (Shear 5) | 2837.5 | 29.2 |
| 19 | 20% PCC and 5% APC (Shear 6) | 2787.8 | 29.9 |
| 26 | 15% PCC | 4244.1 | 15.8 |
| 27 | 20% PCC | 3613.9 | 20.9 |
| 28 | 25% PCC | 3146.8 | 25.4 |
| 29 | 30% PCC | 2672.7 | 30.0 |
| 30 | 35% PCC | 2158.6 | 35.1 |

The strength results were averaged from two measurements from each of 5 sheets. The ash contents were performed on each of the five sheets separately.

The sheared polysilicate composition of test 13 according to the present invention provided equivalent ash content (denoting filler retained in the paper sheet) and to test 27 in the absence of the polysilicate composition but showed an improvement in strength by over 12%. Furthermore, although the unsheared polysilicate of test 15 showed the highest ash content for equivalent conditions of PCC and polysilicate, and all of the sheared polysilicates provided an increased strength.

Figure 2:
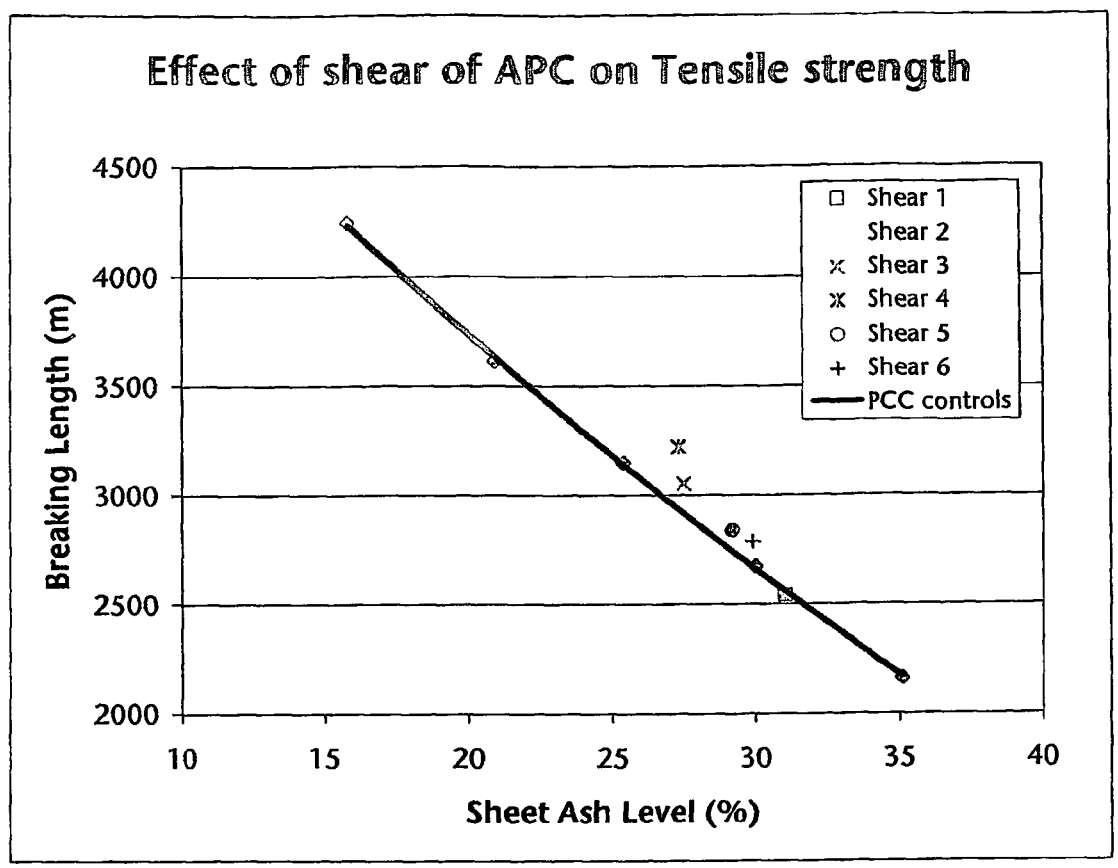

Graphical representations of Table 16 can be found in FIGS. 1, and 2.

The Impact of Shear on APC

From the results in Table 15 the weight of APC lumps remaining in the sieve appear to be inversely proportional to the degree of shear applied. During the viscosity measurements the Brookfield reading decreased significantly as the testing interval increased. (All the results were taken after three revolutions of the spindle at 20 rpm)

Effect of Sheared APC on Sheet Strength

The level of shear was optimised for this system in terms of strength. The greatest increase was seen in FIG. 2 corresponding to APC being sheared for 1 minute at 2000 rpm using the Silverson. The loss of strength at lower levels of shear could be explained by the non-homogenous nature of the silica slurry allowing the silica to remain in discrete particles and to bind to its self rather than to the fibres and fillers.

Effect of Sheared APC on Sheet Appearance

Even a low level of shear removes the appearance of prominent gel spots. The higher level of shear applied to the silica the smaller the gel spots. The sheets were acceptable for all levels of shear applied.

The appearance of the sheet can be improved by eliminating gel spots caused by unsheared APC.

The invention claimed is:

1. A process of making paper or paperboard comprising forming a cellulosic suspension, adding to said cellulosic suspension an aqueous composition comprising a polysilicate, wherein the aqueous composition is a substantially uniform liquid when measured at 25° C., and the aqueous composition is prepared by a method comprising the steps of,
   i) providing an aqueous liquid having a source of silicate,
   ii) adjusting the pH of the liquid to between about 2 and about 10.5, thereby causing polymerisation of the silicate,
   iii) allowing sufficient time for the polymerisation to proceed to substantial completion and thereby forming a product comprising gelled material,
   iv) subjecting the gelled material to sufficient shear to form a substantially uniform liquid.

2. A process according to claim 1 which the source of silicate is selected form the group consisting of sodium silicate, potassium silicate and lithium silicate.

3. A process according to claim 1 in which the aqueous liquid in step (i) also comprises aluminium compounds.

4. A process according to claim 1 in which in step (ii) the pH is adjusted to between 4 and 9.

5. A process according to claim 1 in which the liquid is subjected to agitation in step (iii).

6. The process according to claim 1 in which the product formed in step (iii) comprises amorphous gelled solids dispersed in a liquid.

7. The process according to claim 1, wherein the aqueous composition exhibits a viscosity of at least 200 mPas (when measured at 2% by weight concentration at 25° C. using a Brookfield viscometer, at 20 rpm, spindle No 2).

8. The process according to claim 1, wherein the aqueous composition exhibits a viscosity of at least 1500 mPas (when measured at 2% by weight concentration at 25° C. using a Brookfield viscometer, at 20 rpm, spindle No 3).

9. The process according to claim 1, wherein the polysilicate has a surface area of below 2000 m$^2$/g.

10. The process according to claim 1, wherein the polysilicate has an S-value of below 5%.

11. The process according to claim 1, wherein the aqueous composition comprising the polysilicate, is a substantially uniform liquid when measured at 25° C. and the composition exhibits a viscosity of at least 200 mPas (when measured at 2% by weight concentration at 25° C. using a Brookfield viscometer, at 20 rpm, spindle No 2), and wherein the polysilicate has a surface area of below 2000 m$^2$/g and has an S-value of below 5%.

12. The process according to claim 11, wherein the aqueous composition exhibits a viscosity of at least 1500 mPas (when measured at 2% by weight concentration at 25° C. using a Brookfield viscometer, at 20 rpm, spindle No 3).

13. The process according to claim 1, in which the polysilicate has a surface area of between 750 and 1250 m$^2$/g.

14. The process according to claim 1, wherein the polysilicate is a polyaluminosilicate.

15. The process according to claim 1, in which the aqueous composition comprises at least 0.01% $SiO_2$ by weight.

16. The process according to claim 1, in which a mineral filler is mixed into the cellulosic suspension wherein the mineral filler comprises the aqueous composition.

17. The process according to claim 16, in which the aqueous composition is added to the cellulosic suspension in an amount of from 20 to 250 kg/tonne based on dry weight of polysilicate and dry weight of cellulosic suspension.

18. The process according to claim 17, in which at least one further filler is mixed with the cellulosic suspension, in which the further filler is either a mineral filler and/or an organic pigment.

19. The process according to claim 18 in which the further filler is selected from the group consisting of precipitated calcium carbonate (PCC), ground calcium carbonate, clays, calcined clays, talc, zeolites, silicas, titanium dioxide and structured pigments.

20. The process according to claim 18 in which the aqueous composition and the further filler are combined prior to addition to the cellulosic suspension.

21. The process according to claim 18 in which the aqueous composition and the further filler are added simultaneously or sequentially to the cellulosic suspension.

22. The process according to claim 21 in which the aqueous composition is added to the cellulosic suspension prior to the further filler or the further filler is added to the cellulosic suspension prior to the aqueous composition.

23. The process of making paper or paperboard comprising forming a cellulosic suspension, applying a retention and drainage system to the cellulosic suspension, draining water from the suspension to form a sheet and then drying the sheet, characterised in that applying the retention and drainage system comprises mixing into the cellulosic suspension an aqueous composition comprising a polysilicate, wherein the aqueous composition is a substantially uniform liquid when measured at 25° C., and the aqueous composition is prepared by a method comprising the steps of,
   i) providing an aqueous liquid having a source of silicate,
   ii) adjusting the pH of the liquid to between about 2 and about 10.5, thereby causing polymerisation of the silicate,
   iii) allowing sufficient time for the polymerisation to proceed to substantial completion and thereby forming a product comprising gelled material, iv) subjecting the gelled material to sufficient shear to form a substantially uniform liquid.

24. The process according to claim 23, in which the aqueous composition is mixed into the cellulosic suspension in an amount of at least 100 g/tonne, based on dry weight of polysilicate and on dry weight of cellulosic suspension.

25. The process according to claim 23, in which the retention and drainage system further comprises mixing into the cellulosic suspension a polymeric retention/drainage aid and/or a micro particulate retention/drainage aid.

26. The process according to claim 25, in which the polymeric retention/drainage aid is selected from the group consisting of substantially water-soluble anionic, non-ionic, cationic and amphoteric polymers.

27. The process according to claim 25, in which the micro particulate retention/drainage aid is selected from the group consisting of cross linked organic polymers, silica microgels, colloidal silica, silica sols, silica gels, polysilicates, aluminosilicates, polyaluminosilicates, borosilicates, polyborosilicates, zeolites or swellable clay.

28. The process according to claim 23, in which a polymeric retention/drainage aid is mixed into the cellulosic suspension before at least one shear stage selected from mixing, cleaning and pumping stages and then adding to the cellulosic suspension after the at least one shear stage a retention/drainage aid comprising the aqueous composition.

29. The process according to claim 28 in which a micro particulate retention/drainage aid is also added to the cellulosic suspension after the at least one shear stage.

30. A process of making paper or paperboard comprising forming a cellulosic suspension,
mixing a mineral filler into the cellulosic suspension,
applying a retention and drainage system to the cellulosic suspension,
draining water from the suspension to form a wet sheet and drying the sheet,
characterised in that the mineral filler comprises an aqueous composition comprising a polysilicate, wherein the aqueous composition is a substantially uniform liquid when measured at 25° C., and the aqueous composition is prepared by a method comprising the steps of,
i) providing an aqueous liquid having a source of silicate,
ii) adjusting the pH of the liquid to between about 2 and about 10.5, thereby causing polymerisation of the silicate,
iii) allowing sufficient time for the polymerisation to proceed to substantial completion and thereby forming a product comprising gelled material,
iv) subjecting the gelled material to sufficient shear to form a substantially uniform liquid, and
the cellulosic suspension is passed through at least one shear stage before applying the retention and drainage system, and in which applying the retention and drainage system comprises introducing into the cellulosic suspension the aqueous composition and in which the shear stage is selected from mixing, cleaning and pumping stages.

31. A process according to claim 30, in which at least one further filler is mixed with the cellulosic suspension, in which the filler is either a mineral filler and/or an organic pigment.

32. A process according to claim 31 in which the further filler is selected from the group consisting of precipitated calcium carbonate (PCC), ground calcium carbonate, clays, calcined clays, talc, zeolites, silicas, titanium dioxide and structured pigments.

33. A process according to claim 31 in which the aqueous composition and the further filler are combined prior to addition to the cellulosic suspension.

34. A process according to claim 31 in which the aqueous composition is added to the cellulosic suspension prior to the further filler or the further filler is added to the cellulosic suspension prior to the aqueous composition.

35. A process according to claim 34 in which the aqueous composition is added to the cellulosic suspension before the further filler is added to the cellulosic suspension.

36. The process of making paper or paperboard according to claim 1, comprising forming a cellulosic suspension,
mixing a mineral filler into the cellulosic suspension,
applying a retention and drainage system to the cellulosic suspension,
draining water from the suspension to form a wet sheet and drying the sheet,
characterised in that the mineral filler comprises the aqueous composition comprising a polysilicate, the suspension is passed through at least one shear stage before applying the retention and drainage system,
and in which applying the retention and drainage system comprises introducing into the cellulosic suspension the aqueous composition comprising a polysilicate,
and in which the at least one shear stage is selected from mixing, cleaning and pumping stages and in which PCC mineral filler is added to the cellulosic suspension and the suspension is then passed through the at least one shear stage and then mineral filler comprising the aqueous composition comprising a polysilicate is mixed into the cellulosic suspension.

37. The process of making paper or paperboard according to claim 1 comprising forming a cellulosic suspension, mixing a mineral filler into the cellulosic suspension, applying a retention and drainage system to the cellulosic suspension, draining water from the cellulosic suspension to form a wet sheet and drying the sheet, characterised in that the mineral filler comprises the aqueous composition, the cellulosic suspension is passed through at least one shear stage before applying the retention and drainage system, and in which applying the retention and drainage system comprises introducing into the cellulosic suspension the aqueous composition and in which the at least one shear stage is selected from mixing, cleaning and pumping stages, in which subsequent to the addition of mineral filler comprising the aqueous composition, the cellulosic suspension is passed through the at least one shear stage followed by the addition of a polymeric retention/drainage aid and then the cellulosic suspension is passed through at least one further shear stage after, which a retention/drainage aid comprising the aqueous composition is added to the cellulosic suspension.

38. The process according to claim 37 in which a further micro particulate retention/drainage aid is added to the cellulosic suspension prior to, simultaneously with or after the addition of the retention/drainage aid comprising the aqueous composition.

39. The process of making paper or paperboard according to claim 1 comprising forming a cellulosic suspension, adding a strength aid to the cellulosic suspension, draining water from the suspension to form a wet sheet and drying the sheet, characterised in that the strength aid comprises the aqueous composition.

* * * * *